United States Patent [19]
Bishop et al.

[11] Patent Number: 5,321,406
[45] Date of Patent: Jun. 14, 1994

[54] METHOD OF TRACK MERGING IN AN AIRCRAFT TRACKING SYSTEM

[75] Inventors: Douglas L. Bishop; Patricia K. Sturm; Kathryn W. Ybarra, all of Phoenix, Ariz.

[73] Assignee: Honeywell, Inc., Minneapolis, Minn.

[21] Appl. No.: 995,212

[22] Filed: Dec. 22, 1992

[51] Int. Cl.$^5$ .............................................. G01S 13/93
[52] U.S. Cl. ........................................ 342/32; 342/37; 342/38
[58] Field of Search ................................ 342/32,37,38

[56] References Cited

PUBLICATIONS

U.S. Patent Application Ser. No. 07/968,100 "A Method of Aircraft Tracking System".
U.S. Patent Application Ser. No. 07/767,007 "Method of Bearing System".
U.S. Patent Application Ser. No. 07/976,150 "A Method of Improved Initial Transmission of Acquisition and Tracking Interrogations in an Aircraft Tracking System".

Primary Examiner—T. H. Tubbesing
Attorney, Agent, or Firm—Brian C. Downs; Dale E. Jepsen; Ronald E. Champion

[57] ABSTRACT

A method of processing a plurality of tracks representative of one or more target aircraft in a vicinity of a surveillance aircraft, where each track is generated in response to target reply signals provided by the target aircraft in response to interrogation signals transmitted by the surveillance aircraft, includes eliminating a portion of the plurality of tracks which are duplicate tracks of the same target aircraft. The remaining tracks are maintained and updated in response to the target reply signals provided by the target aircraft. A threat level for each of the remaining tracks is determined and two or more of the remaining tracks which are possibly representative of a same target aircraft are merged resulting in a composite track. The composite track is output to a display device utilizing information from a particular remaining track of the composite track having the greatest threat level to the surveillance aircraft while continuing to maintain and update all the remaining tracks.

12 Claims, 10 Drawing Sheets

Fig. 4B (*)ALTITUDE AND BEARING ONLY IF AVAILABLE

METHOD OF TRACK MERGING IN AN AIRCRAFT TRACKING SYSTEM

FIELD OF THE INVENTION

The present invention relates to a method of tracking target aircraft in an aircraft tracking system. More particularly, the present invention relates to a method of track merging in an aircraft tracking system to reduce clutter on a traffic display and to reduce aural alerts.

BACKGROUND OF THE INVENTION

The increased demands put on aircraft flight crew as a result of more complex technology, ever increasing aircraft traffic, and increased demands for safety has brought about a requirement for monitoring aircraft traffic in the vicinity of a surveillance aircraft. Such monitoring includes the automatic identification of potential threats to a surveillance aircraft monitoring target aircraft in such vicinity. As a result, target aircraft have transponders which in response to appropriate interrogation signals return reply signals which may provide information with respect to the range, altitude and bearing of the target aircraft. Certain traffic control system transponders, such as the Mode S systems include unique aircraft identifiers so that each target aircraft is interrogated separately and each reply is stamped with the identity of the target aircraft. This significantly simplifies surveillance processing by the surveillance aircraft.

In systems such as an Air Traffic Control Radar Beacon System (ATCRBS), which do not include unique aircraft identification information in replies to interrogation signals, the determination of aircraft tracks representative of target aircraft from replies is more difficult. The information obtained by periodic interrogation of target aircraft during surveillance periods from the replies provided by the target aircraft are subjected to algorithms to provide a target aircraft track. Once the track is identified and initialized, then the track can be updated and monitored to determine if the target aircraft is a threat to the surveillance aircraft.

Track determination is complicated for several reasons, generally involving spurious target replies. For example, with reference to FIG. 1, a surveillance aircraft 10 can transmit an interrogation signal 16 to a target aircraft 12, whereupon a transponder in the target aircraft 12 provides a first reply signal 18. The delay between the transmission of the interrogation signal and the reception of the reply signal provides range information concerning the distance of the surveillance aircraft from the target aircraft. However, the interrogation signal 16 can result in a second reply signal 19 that is reflected from the ground 14. The second reply signal 19, reflected once from the ground 14, is generally referred to as a single reflection multipath reply. Because the length of time for the travel of the second reply signal is longer than the first reply signal 18, the second reply signal 19 can be interpreted as being from a separate target aircraft at a greater range from the surveillance aircraft. A single reflection multipath reply also can be generated from the interrogation signal 17 being reflected off the ground 14 combined with the direct reply 18 to surveillance aircraft 10 from target aircraft 12. Since the path length is the same as the previous case, where the reply is reflected and the interrogation is direct, the range is the same. Similarly, the interrogation signal 17 can reflect off the ground 14, activate the transponder of the target aircraft 12 which provides a reply signal 20 that also reflects off the ground 14. In this instance, since both the interrogation signal 17 and the reply signal 20 are each reflected off the ground 14, this reply is referred to as a double reflection multipath reply. These double reflection multipath replies will be interpreted by the surveillance aircraft 10 as a target aircraft 12 at an even greater range than indicated by the direct or single reflection multipath replies.

Figure 2:
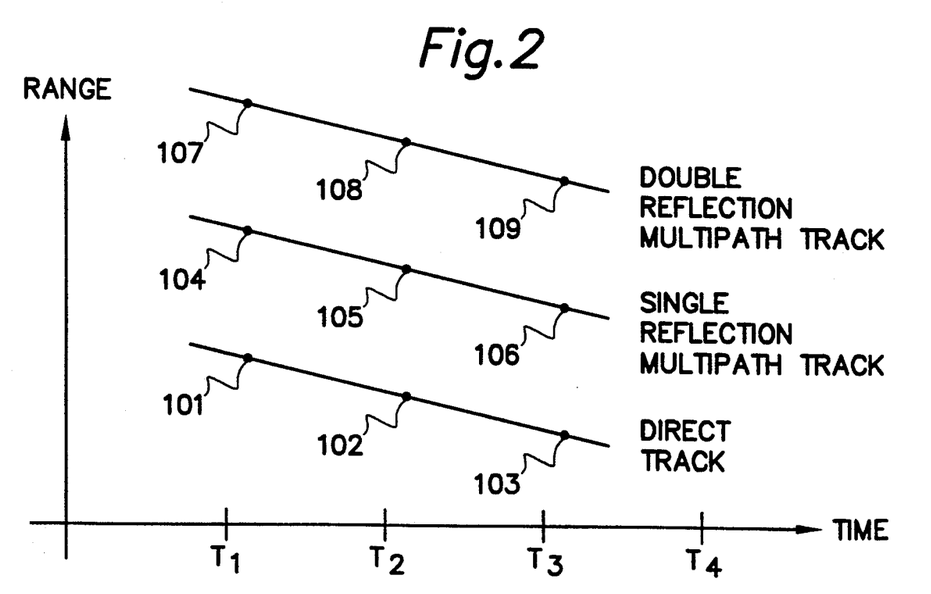
FIG. 2 is a charted illustration of tracks for a single target aircraft

In these situations, a single target aircraft is providing the surveillance aircraft 10 with a plurality of target responses during each interrogation. Thus, from a single surveillance period, consisting of multiple interrogations, multiple replies can be received from a single target aircraft. Such multiple replies may result in multiple tracks as shown in FIG. 2, where a direct reply track 101-103, a single reflection multipath track 104-106, and double reflection multipath 107-109 are indicated. Tracks can also be formed on mixtures of reply types, such as for a combination of single and double reflection replies. In addition, tracks can result from false replies due to electromagnetic interference or other effects such as ATCRBS transponder replies from insufficiently suppressing Mode S transponders.

As a result of the number of tracks which can be interpreted from the various replies from the target aircraft 12, a single target aircraft may have multiple tracks associated therewith. Such multiple tracks may be associated with a single ATCRBS transponder equipped target aircraft, however, will not occur with regard to a Mode S transponder equipped target aircraft as the Mode S equipped target aircraft has unique identification which prevent such multiple tracks from occurring. However, Mode S equipped target aircraft sometimes answer interrogations intended for ATCRBS equipped target aircraft and this may lead to ATCRBS replies in addition to the Mode S reply; thus forming duplicate tracks for a single Mode S equipped transponder target aircraft.

The multiple tracks for a single target aircraft may be referred to as split tracks. Such split tracks for a single target aircraft may be the result of multipath false replies. Split tracks may be displayed for an aircraft flight crew by a Traffic Alert and Collision Avoidance System (TCAS). Display symbols representative of target aircraft displayed as a result of one or more tracks of a split track results in excess clutter on the display and may also lead to excess aural messages to the flight crew. Such clutter is most prevalent at low altitudes and during turns when the flight crew workload is greatest. This excess clutter on the TCAS displays results in unnecessary and increased flight crew workload.

The Minimum Operational Performance Standards (MOPS) for Traffic Alert and Collision Avoidance System (TCAS) Airborne Equipment, manual document no. DO-185 by the Radio Technical Commission for Aeronautics (RTCA) which governs the operation of aircraft collision avoidance apparatuses, suggests an algorithm for merging split tracks based on multipath replies, insufficiently suppressed Mode S transponders, false replies, or other replies not accurately representative of target aircraft. This merging (in addition to enhanced merging functions) is performed in the TCAS surveillance functions. However, although some merging can be done in surveillance processes, the criteria need to be conservative so that tracks representative of real target aircraft, as opposed to a track of a split track for a single target aircraft, are not eliminated. If a track of a real target aircraft is eliminated, such target aircraft tracks are no longer tracked or updated. A threat from such an aircraft cannot be immediately introduced to the flight crew by means of the TCAS display. It takes a few seconds to re-acquire a track once it is eliminated and it takes even longer for that track to stabilize. Thus, there is some time delay danger in not adequately monitoring real target aircraft if conservative criteria for track merging in a TCAS surveillance process or collision avoidance system (CAS) process are not utilized. Such loss of track information regarding a real target aircraft which presents a threat to the surveillance aircraft is unacceptable. Therefore, there is a need to provide further TCAS track merging capabilities to remove excess display clutter while maintaining a conservative approach to eliminating tracks which are potentially split tracks based on multipath replies, false replies, etc.

SUMMARY OF THE INVENTION

The present invention is directed to a method of processing a plurality of tracks representative of one or more target aircraft in a vicinity of a surveillance aircraft. Each track is generated in response to target reply signals provided by the target aircraft in response to interrogation signals transmitted by the surveillance aircraft. The method includes a step of eliminating a portion of the plurality of tracks which are duplicate tracks of a same target aircraft. The remaining tracks not eliminated are maintained and updated in response to the target reply signals provided by the target aircraft. A threat level for each of the remaining tracks is determined and two or more of the remaining tracks which are possibly representative of a same target aircraft are merged resulting in a composite track. The composite track is output to a display device utilizing threat level information from a particular remaining track of the composite track having the greatest threat level to the surveillance aircraft. The composite track is output to the display device while continuing to maintain and update all the remaining tracks.

In another embodiment of the invention, the merging step includes determining whether two of the remaining tracks have a similar bearing. It is also determined whether both of the two remaining tracks have unique addresses identifying them as separate target aircraft. If both remaining tracks do not have unique addresses and both have similar bearings, then it is determined whether both of the two remaining tracks are altitude reporting or non-altitude reporting tracks. If both tracks are altitude reporting tracks, range and altitude information of each of the tracks from the surveillance aircraft are compared to predetermined merge conditions. If both tracks are non-altitude reporting, then the range information is compared to the predetermined merge conditions. The two tracks are merged if the predetermined merge conditions are satisfied.

In yet another embodiment of the present invention, the method further includes the step of merging output of aural annunciations for composite tracks. The aural annunciations are reduced as only one aural annunciation is output for a composite track which may be comprised of one or more remaining tracks.

In another embodiment of the invention, an apparatus for processing a plurality of tracks representative of one or more target aircraft in a vicinity of a surveillance aircraft is described. Each track is generated in response to target reply signals provided by the target aircraft in response to interrogation signals transmitted by the surveillance aircraft. The apparatus includes surveillance means for initializing the plurality of tracks. The surveillance means includes means for eliminating a portion of the tracks which are duplicate tracks of particular target aircraft or false tracks non-representative of the target aircraft and also means for updating remaining tracks not eliminated in response to the target reply signals provided by the target aircraft. The apparatus further includes collision avoidance means for determining a threat level for each of the remaining tracks and merging means for merging two or more of the remaining tracks which are possibly representative of a same target aircraft resulting in a composite track. Output means outputs a single symbol for the composite track utilizing information concerning a particular remaining track of the composite track which has the greatest threat level to the surveillance aircraft while the surveillance means continues to maintain and update the remaining tracks.

DETAILED DESCRIPTION OF THE PREFERRED EMBODIMENTS

Figure 1:
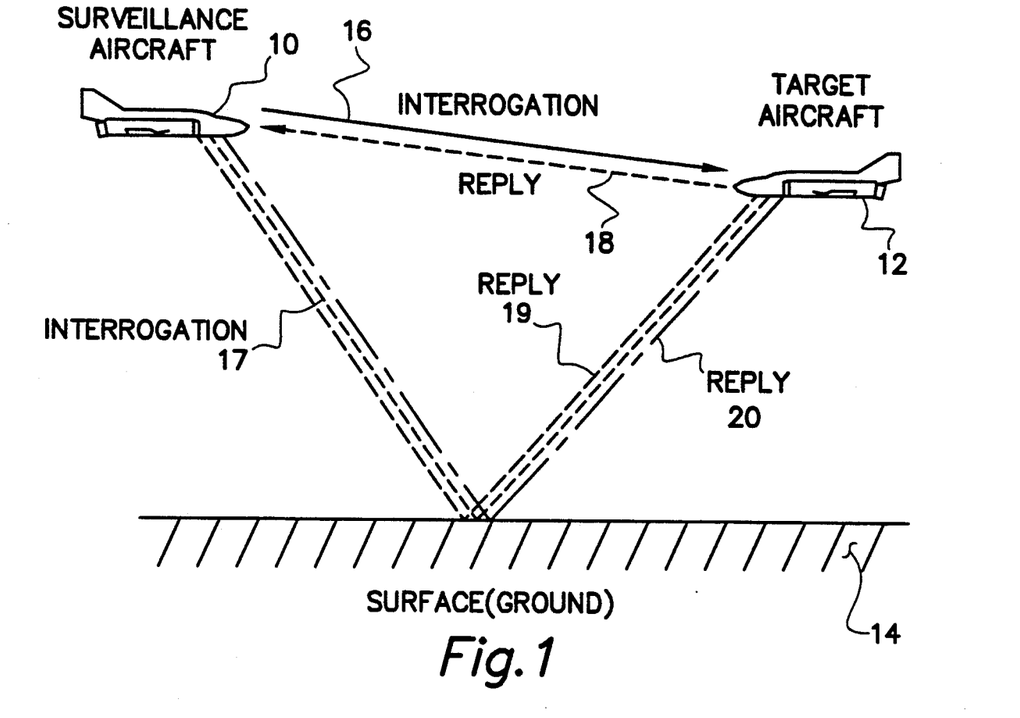
FIG. 1 shows a diagram of possible signal paths of target aircraft replies in response to surveillance aircraft interrogation signals.

Referring to FIG. 1, there is shown a surveillance aircraft 10 engaged in an interrogation-reply process with a target aircraft 12. The surveillance aircraft 10, having a TCAS/transponder system 22, FIG. 3, interrogates all target aircraft, including target aircraft 12, in the vicinity of the surveillance aircraft 10 in order to determine potentially dangerous situations. The TCAS/transponder system 22 includes a transponder system 26, TCAS computer unit 24, TCAS displays 28, means for presenting aural messages 30, a top directional antenna 32, and a bottom directional or omnidirectional antenna 34. TCAS/transponder system 22 installed on the surveillance aircraft 10 may utilize ATCRBS transponders and Mode S transponders installed in target aircraft to provide locations of such target aircraft in the immediate vicinity of the TCAS equipped surveillance aircraft 10. TCAS/transponder system 22 provides surveillance by transmitting interrogation signals to target aircraft for measuring the relative range, altitude and bearing from the replies provided by the target aircraft. The measured data and the rate of change of this reply data are utilized by the TCAS/transponder system 22 to provide a prediction of aircraft penetration into a predetermined TCAS protection volume for a subsequent flight time. When target aircraft penetration is predicted within this volume and time, an advisory is given to the flight crew to take corrective action by way of the display devices 28 and means for presenting aural messages 30.

Figure 3:
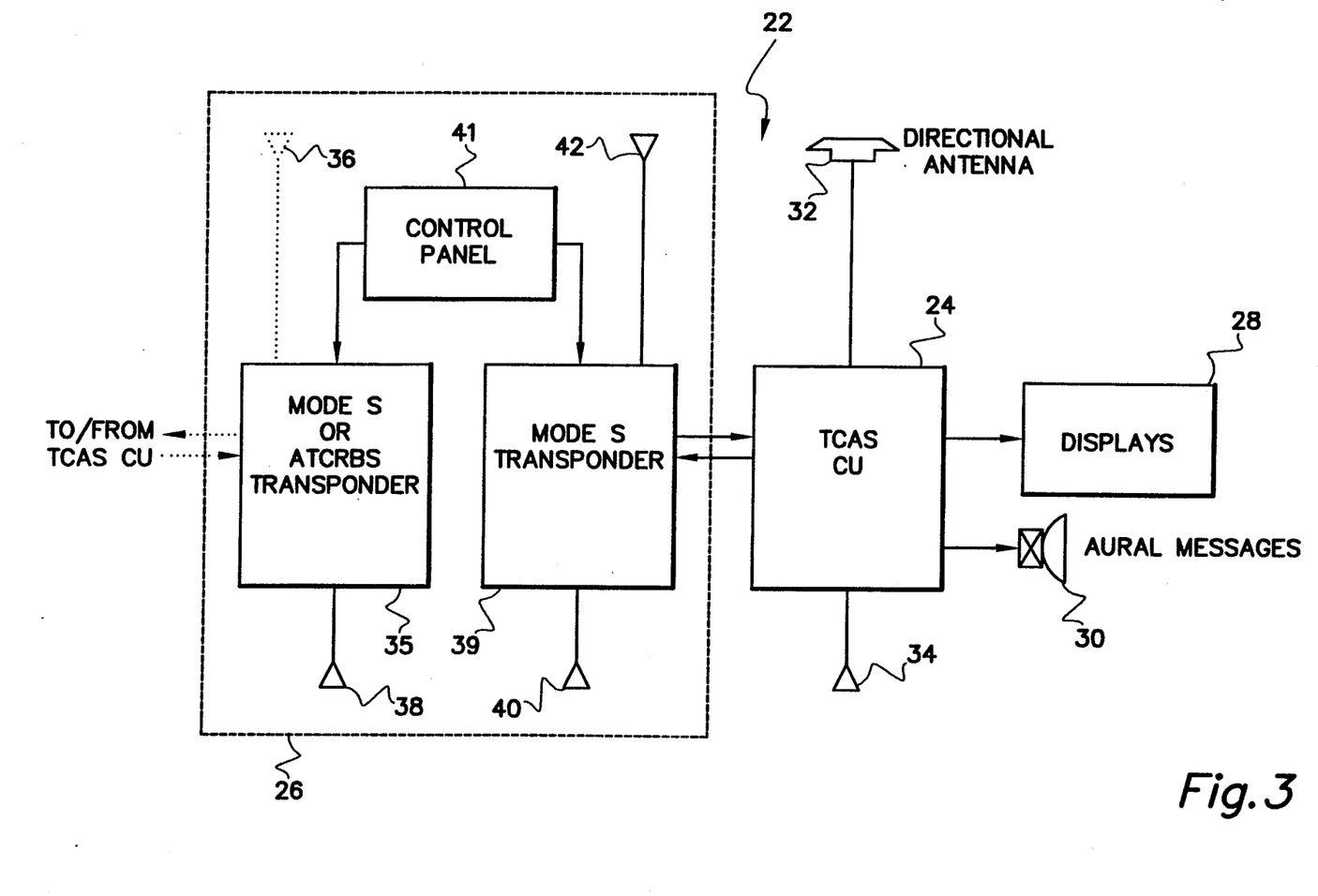
FIG. 3 is a block diagram of a TCAS/transponder system in which the present invention can be utilized.

TCAS computer unit 24 of surveillance aircraft 10 interfaces to a top directional antenna 32 and to a bottom o directional antenna 34. The bottom directional antenna 34 may instead be an omni-directional antenna. The TCAS computer unit 24 outputs interrogations and listens for replies from target aircraft provided in response to these interrogations through top and bottom directional antennas 32, 34. The replies from the target aircraft include multipath replies and false replies as indicated in the Background of the Invention section herein. Such multipath replies and false replies complicate the identification of a target aircraft track by the TCAS computer unit 24.

The TCAS computer unit 24 works in cooperation with the transponder system 26. The dual transponder system 26 includes a Mode S transponder 39, a Mode S or an ATCRBS transponder 35 and a control panel 41 used to control the transponders 35, 39 and the TCAS/transponder system 22. The transponder system 26, FIG. 3, is the transponder system of the surveillance aircraft 10 and is not the transponder system of target aircraft. The transponder system of the target aircraft is not shown, but may include a Mode S transponder, an ATCRBS transponder, or both. Mode S transponder 39 interfaces with omni-directional antenna 42 and omni-directional antenna 40 to provide and receive Mode S interrogations and replies. The Mode S transponder 39 directly interfaces with the TCAS computer unit 24. If transponder 35 is a Mode S transponder, the Mode S transponder 35 interfaces with the TCAS computer unit 24 and is associated with omni-directional antenna 36 and omni-directional antenna 38. However, if transponder 35 is an ATCRBS transponder, omni-directional antenna 36 is unnecessary and the local ATCRBS transponder 35 does not interface to TCAS computer unit 24. The local ATCRBS transponder 35 provides replies from surveillance aircraft 10 to other surveillance aircraft which have transmitted interrogation signals to the surveillance aircraft 10 to allow other surveillance aircraft to determine whether surveillance aircraft 10 is a potential threat to the other surveillance aircraft.

Figure 4A:
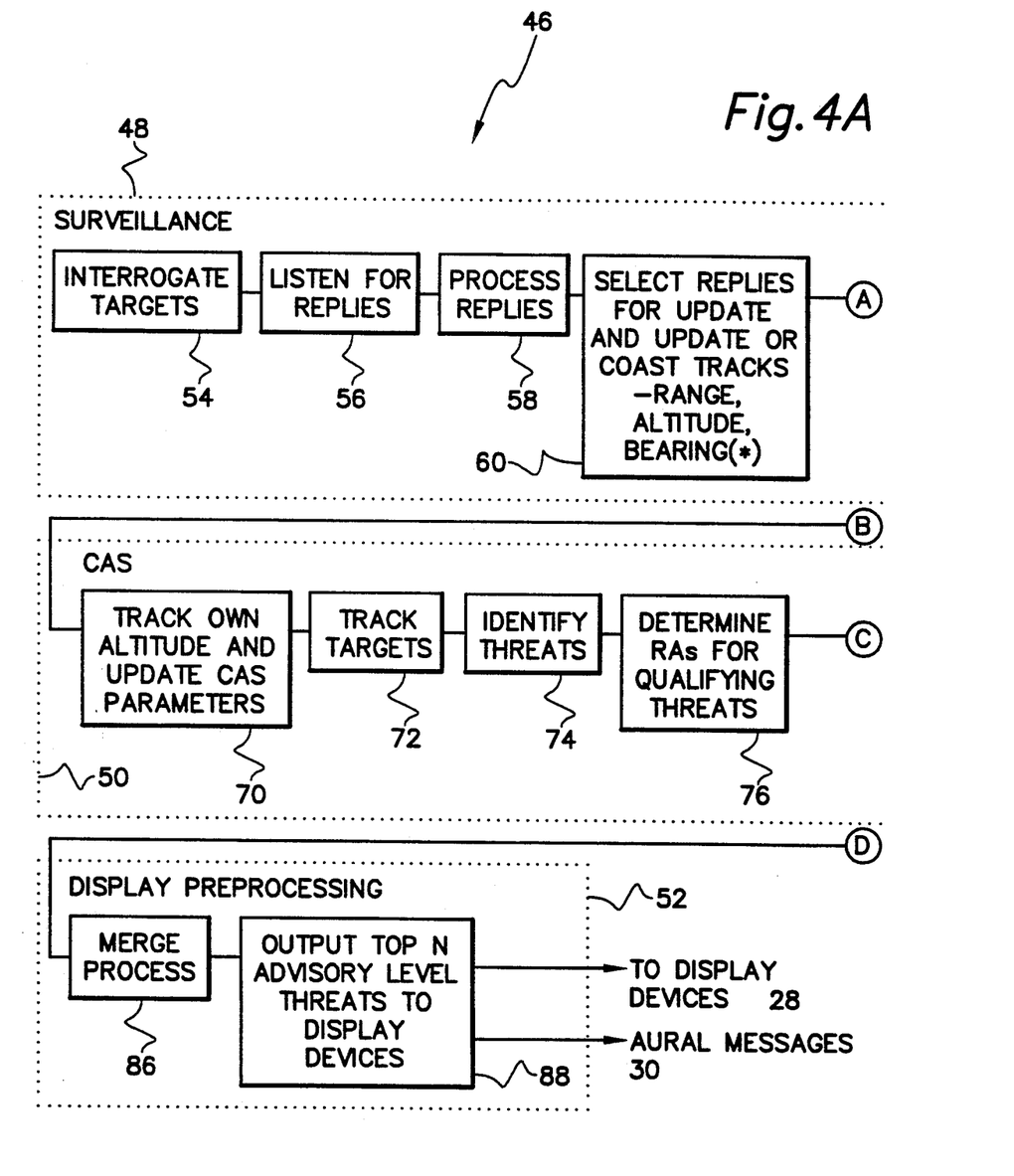
FIGS. 4A and 4B show a block diagram of primary TCAS processes for the TCAS/transponder system of FIG. 3.
Figure 4B:
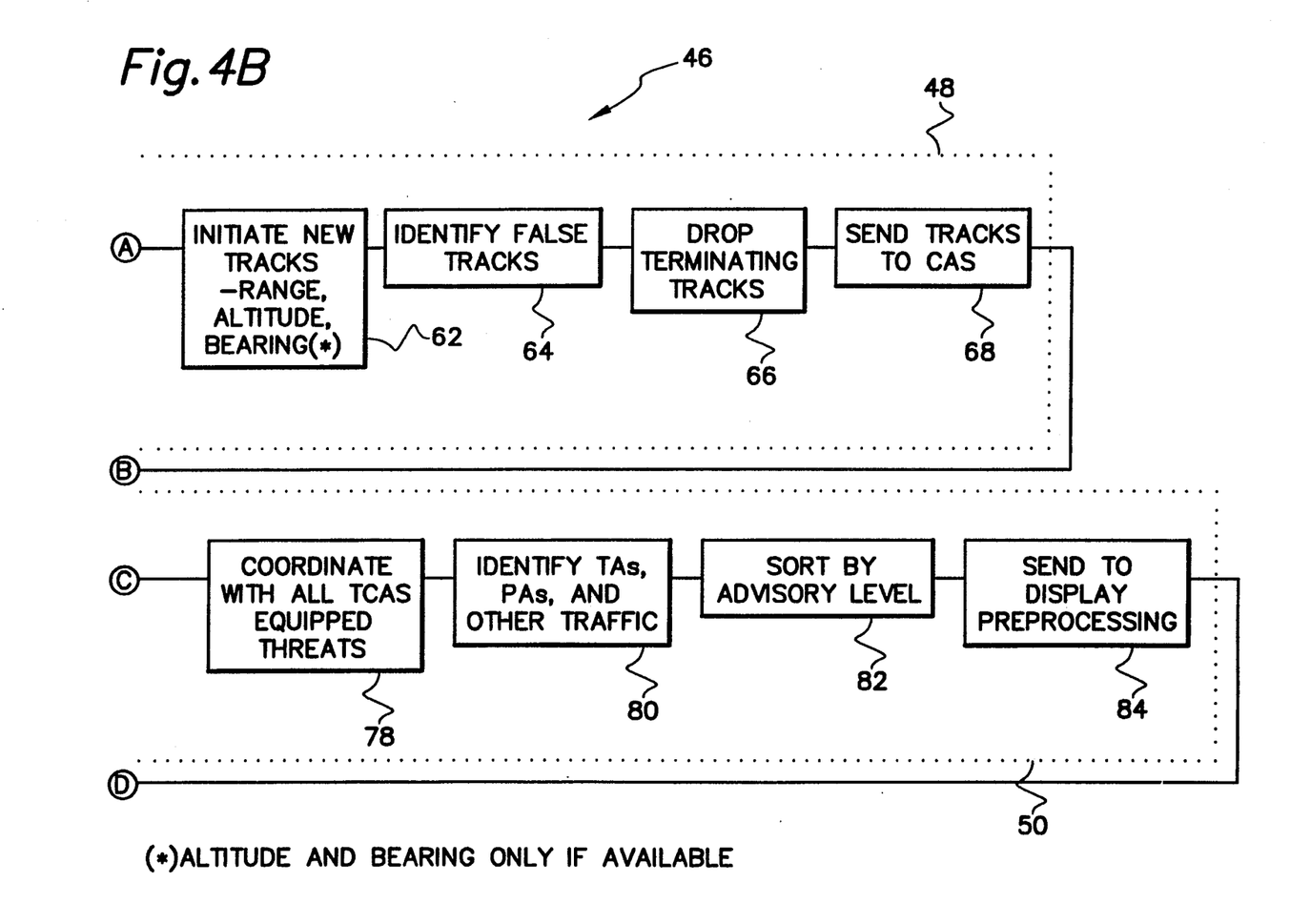

The TCAS computer unit 24 of the surveillance aircraft 10 processes replies of target aircraft which may be equipped with two types of transponders, ATCRBS transponders and Mode S transponders. In the case of ATCRBS transponder equipped target aircraft, there is no unique aircraft identifier so the process of identifying and tracking target aircraft is complicated. Because such complication exists, it is necessary for surveillance process 48, FIG. 4, to determine which replies belong to which target aircraft and to reject multipath and false replies a described in the Background of the Invention section herein which may be representative of a single target aircraft. Tracks initialized from such multipath replies or false replies representative of a single target aircraft shall be referred to as split tracks as discussed previously.

Figure 7A:
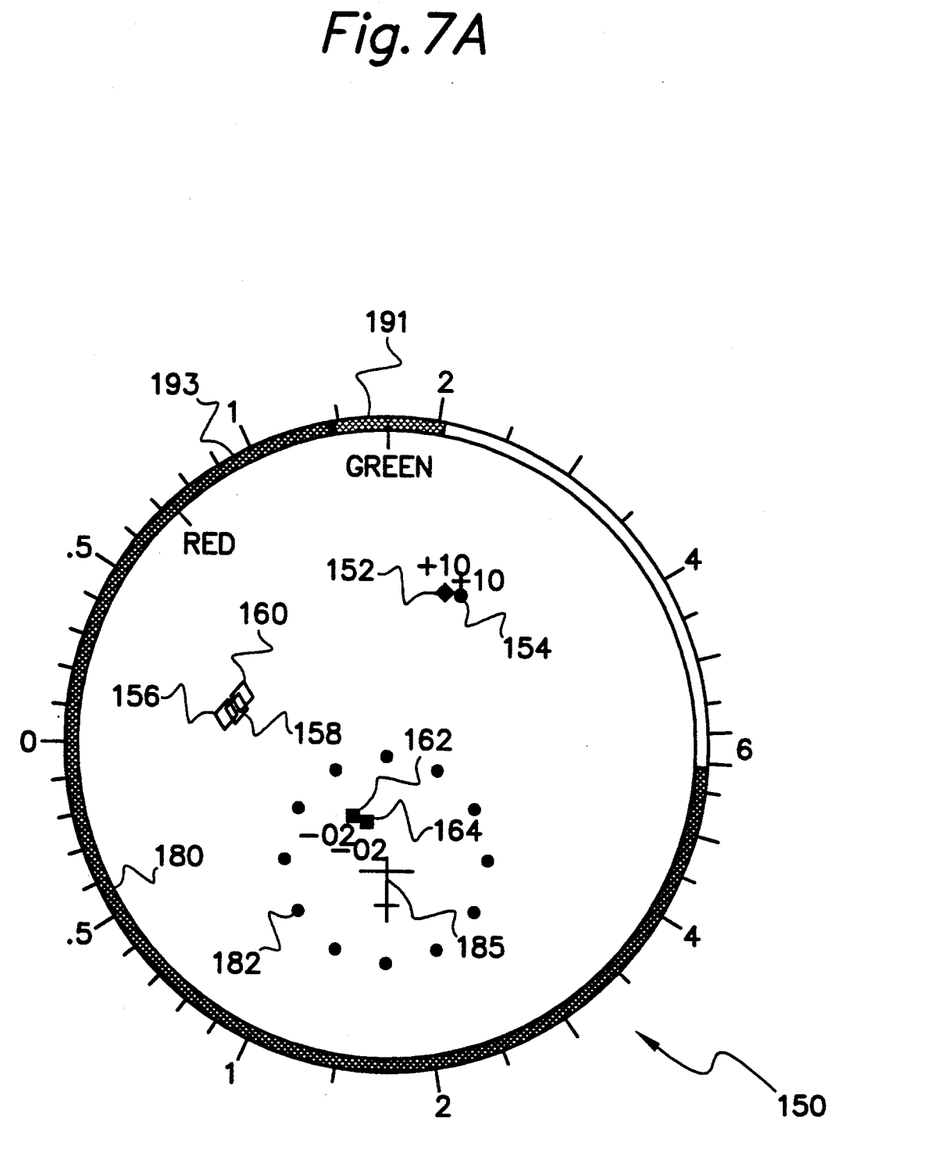
FIG. 7A and FIG. 7B are diagrams of TCAS displays before and after implementation of the merge process of FIGS. 6A, 6B and 6C.

In the case of Mode S transponder equipped target aircraft, there is a unique aircraft identifier, so each target aircraft is interrogated separately and each reply is stamped with the identity of the responding target aircraft. Since Mode S equipped target aircraft have unique aircraft identifiers, multiple Mode S tracks for a single target aircraft do not occur. However, multiple ATCRBS tracks as well as a single Mode S track may occur for a single Mode S equipped target aircraft. Split tracks due to the processing of multipath replies and other effects often occur for a single ATCRBS equipped target aircraft. Such split tracks are the tracks responsible for clutter on the TCAS displays in the flight crew work areas as can be seen in FIG. 7A.

The TCAS computer unit 24 of the surveillance aircraft 10, includes programs for executing primary TCAS processes 46, FIG. 4, utilizing information from the interrogation/reply method between the surveillance aircraft 10 and target aircraft. In particular, the primary TCAS processes 46 include surveillance process 48 which identifies target aircraft and provides collision avoidance system (CAS) process 50 with target aircraft data. The CAS process 50 determines the threat level of the target aircraft from the data supplied from the surveillance process 48 and furnishes such threat level information to display preprocessing 52 such that the threat level information can then be furnished to the flight crew through display devices 28 and means for presenting aural messages 30. Such aural presentation means 30 may be any appropriate annunciation equipment.

FIG. 4 shows in block diagram form an overview of the primary TCAS processes 46. FIG. 4 has been simplified and does not show the exact sequence of processing events. For example, the TCAS/transponder system 22 interrogates an ATCRBS equipped target aircraft using an interrogation sequence consisting of approximately 100 further steps. After each step, the TCAS/transponder system 22 listens for replies. At the end of the ATCRBS interrogations of the ATCRBS equipped target aircraft, the TCAS system 22 processes the ATCRBS replies from the target aircraft and tracks the target aircraft resulting therefrom. This ATCRBS processing takes place concurrently with the processing of replies from Mode S equipped target aircraft. Surveillance process 48 interrogates each qualified Mode S equipped target aircraft and after each Mode S interrogation, TCAS/transponder system 22 listens for replies, processes the replies and updates the tracks representative of such Mode S equipped target aircraft. The timing of such concurrent processing is not shown in FIG. 4.

Surveillance process 48 of the primary TCAS processes 46 includes the execution of various program processes. Surveillance process 48 interrogates a target aircraft 12 (Block 54) by performing a predetermined interrogation sequence transmitting interrogation signals to target aircraft. The surveillance process 48 then listens for replies (Block 56) from target aircraft. The replies are then processed (Block 58) to prevent duplicate replies and false replies. Such false replies may include reply signals which are a result of electromagnetic interference or other effects. After elimination of such replies, surveillance process 48 then selects the replies for tracks that have been previously identified for particular target aircraft (Block 60). The previously identified particular tracks can then be updated with the new reply information. If a reply for a previously identified track cannot be located, this previously identified track is coasted (Block 60). Such coasted tracks if not updated for a sufficient period of time, for example six surveillance periods, are dropped and no longer followed or updated.

When all of the previously identified tracks for particular target aircraft have been updated, the surveillance process 48 proceeds in initiating new tracks having particular range, altitude and bearing, if available (Block 62). In the case of the ATCRBS transponder equipped target aircraft, the replies from such aircraft which are remaining after reply processing (Block 58) and track updating (Block 60) are used to initiate the new tracks.

Following the initialization of new tracks, false tracks or multipath tracks are identified (Block 64). For example, MOPS suggests an algorithm for merging split tracks, based on multipath tracks or false tracks, in surveillance process 48. Such track merging algorithms in the surveillance process 48 must be of a conservative nature so that real target aircraft are not eliminated. For example, the two tracks which are proposed to be merged in the surveillance process 48 may actually be representative of two real target aircraft. When a track representing one of these two real target aircraft is dropped, all the history on the track is lost and, as indicated in the Background of the Invention section herein, there is some danger in not adequately monitoring the real target aircraft and presenting the flight crew with misinformation or inadequate information Following the merging of split tracks, based on multipath tracks or false tracks, on a conservative basis, the coasting tracks which have not been updated for some period of time as discussed above are dropped (Block 66) and the tracks identified which ar representative of target aircraft and which contain substantially accurate information are sent to CAS process 50. Further information with regard to surveillance process 48 is described in U.S. Pat. No. 5,107,268 to Sturm, et al. issued 21 Apr. 1992 hereby entirely incorporated herein by reference thereto. The CAS process 50 receives the data concerning the tracks from surveillance process 48. The CAS process 50 tracks its own altitude, i.e. the altitude of the surveillance aircraft 10, and selects CAS parameters such as threat protection volumes based on selected sensitivity levels, altitude bands, etc. Such parameters are also updated (Block 70). The track data received from surveillance process 48 is processed along with the tracking of data itself by CAS process 50 to track the target aircraft represented by the track data with respect to the surveillance aircraft (Block 72).

Target aircraft which qualify as threats to surveillance aircraft 10 are identified (Block 74). If there are any qualifying threats identified, then CAS process 50 determines a resolution advisory for the threats. If there are multiple threats, CAS process 50 considers all of the threats, or potential dangerous target aircraft, and determines a single composite resolution advisory (Block 78). It is necessary for coordination to take place with each TCAS identified target aircraft which is generating a resolution advisory to assure that complementary advisories are utilized (Block 78). Additional logic resolves conflicts between the resolution advisories. Detected aircraft which pose threats to surveillance aircraft 10 are identified by various advisory levels other than resolution advisories. Such advisory levels include traffic advisories, proximate traffic advisories and other traffic advisories (Block 80). The advisory levels for the target aircraft identified and which are potential threats to the surveillance aircraft 10 are sorted by advisory level (Block 82) and sent to display preprocessing 52 (Block 84). Display preprocessing 52 processes the list of target aircraft represented by their tracks to merge split tracks (Block 86). Merge processes (Block 86) will be explained further below with respect to the present invention. A display output, utilizing such apparatus as a graphics processor (Block 88) is generated and the images are displayed on display devices 28.

Figure 7B:
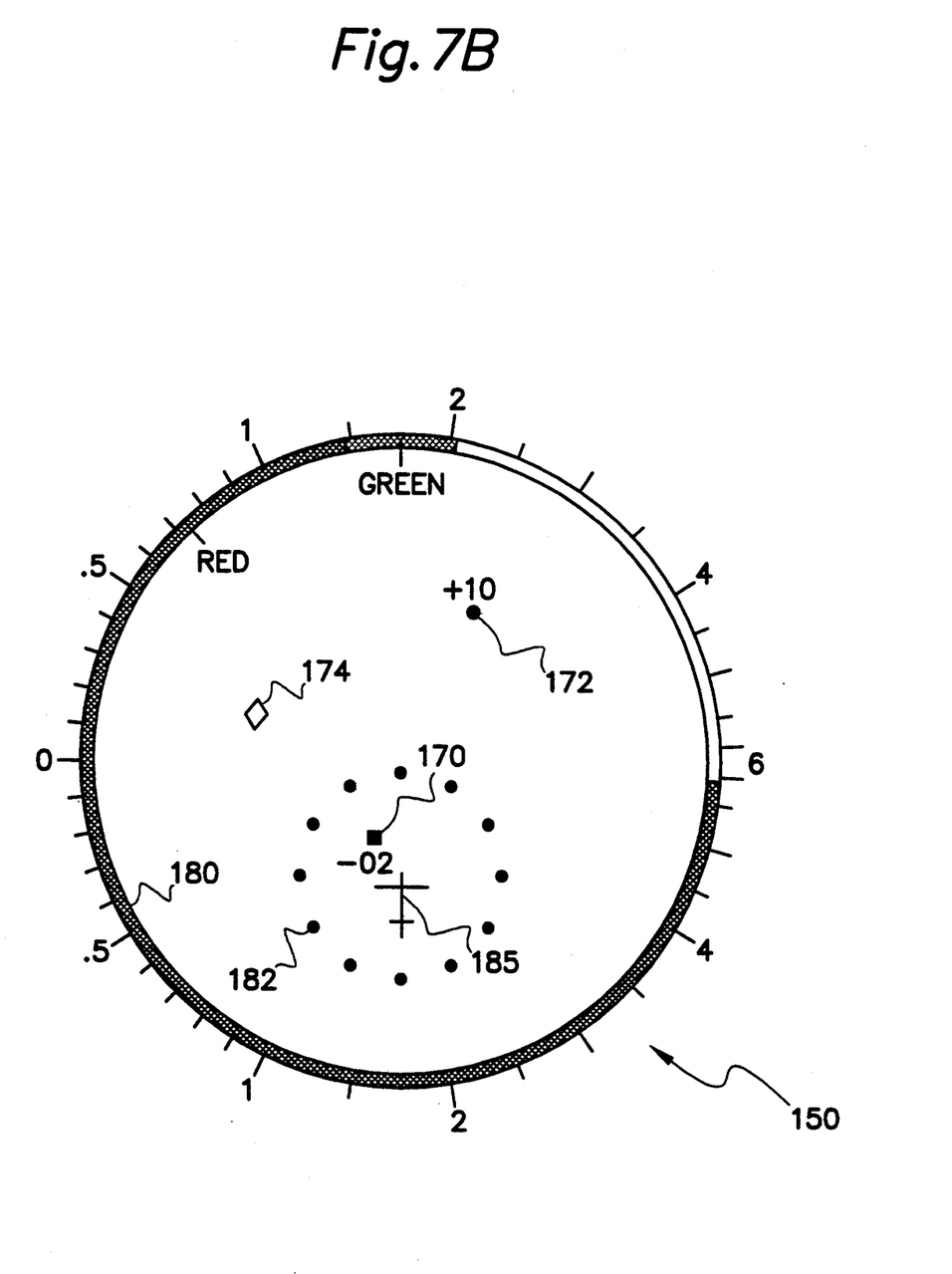

Display devices 28 may include traffic advisory (TA) displays or resolution advisory (RA) displays. Such TA displays and RA displays may or may not be combined. It is also possible to put a TA display on another instrument such as a weather radar or to modify a Vertical Speed Indicator with eyebrow lights to indicate resolution advisories. One example of a combined TA and RA display 150 is shown in FIG. 7A and 7B. With reference to FIG. 7A, the combined TA and RA display shows the surveillance aircraft symbol 185, a range ring 182, a resolution advisory ring 180, and traffic symbols for target aircraft. Target aircraft identified as resolution advisory target aircraft are displayed as solid squares, traffic advisory target aircraft are shown as solid circles, proximate traffic advisory target aircraft are shown as solid diamonds and other target aircraft advisories are shown as outlined diamonds. The relative altitude (in 100's of feet) for altitude reporting target aircraft is included next to the target aircraft symbol and the altitude trend is given by an upward, downward or no arrow. The RA display portion of the combined display combines a vertical speed indicator with shaded rings 180 which indicate the vertical speeds which the pilot should not fly (darker shade) 193 or should fly (lighter shade) 191. The darker and lighter shaded rings are only present when a resolution advisory is in effect.

The display devices 28 present visual display of target aircraft to the flight crew along with presentation of aural messages 30. The aural messages or annunciations are associated only with symbols of target aircraft sent to the display devices 28. The aural annunciations also occur when the threat level status of the target aircraft are changed to a higher or lower classification. Some possible threat level states are increased resolution advisory, resolution advisory, weakened resolution advisory, preventative advisory, clear of conflict advisory, traffic advisory, proximate advisory, and other advisories.

As indicated previously above, some merging of split tracks for a single target aircraft is performed in surveillance process 48, but the criteria must be conservative so that tracks of real target aircraft are not eliminated and are continued to be tracked if such split tracks actually turn out to be two separate target aircraft rather than a split track for one single aircraft. In order to reduce the clutter on a TCAS traffic display due to split tracks, merge process (Block 86) identifies such split tracks and eliminates all but one of the tracks on what is considered to be a single target aircraft prior to sending the display output representative of target aircraft to the display devices 28. This method eliminates clutter on the traffic display due to the split tracks and eliminates excess aural annunciations made when display output representative of the split tracks are sent to the display device 28. At the same time, the information concerning all relevant threats and advisories for the tracks, whether a part of a split track identified by the merge process (Block 86) or not, is retained. This relevant threat and advisory information is retained by surveillance process 48 and CAS process 50 which continue to process all of the target aircraft tracks regardless of the merge process. Thus, if the tracks separate into two or more distinct target aircraft the information concerning such tracks is immediately available for output to display devices 28 as representing separate established and stabilized tracks and the aural annunciations 30 for each separate track can be provided to the flight crew immediately.

The merge process (Block 86) of display preprocessing 52 shall be described in further detail with reference to FIGS. 5-7B. Merge process (Block 86) processes two or more tracks representative of possible target aircraft such that when this group of tracks meet certain target aircraft type, range, altitude and altitude rate requirements, the tracks are combined into a single composite aircraft for purposes of displaying a symbol for the target aircraft on display device 28 and issuing a single aural message 30 for them if applicable. As a result of merging the group of tracks into a single composite target aircraft for purposes of display and aural messages, excess symbols on such display devices 28 and aural messages for the output are eliminated. In the case of the RA display portion of combined display 150, FIG. 7A, there will be no difference in the RA display portion before or after the merge process (Block 86) is implemented since the resolution advisory sent to the RA display portion of the combined display always is a composite of the resolution advisories from all the tracks of all target aircraft generated by the algorithms of CAS process 50. However, the TA display portion of the combined display will be sent a symbol of a composite target aircraft and consist of the highest threat level of the group of tracks merged and the range, altitude, and bearing of the track representative of the closest target aircraft in the group rather than showing symbols for each track of the group. Although the aural annunciations for display of resolution advisories are unaffected as a composite of the resolution lo advisories is displayed on the RA portion of the display, the other aural alerts associated with the display of symbols for other target aircraft are reduced as only one aural message will be annunciated for each group of tracks merged and displayed as a composite track.

Because a group of merged tracks may actually be representative of more than one target aircraft, the surveillance process 48 and CAS process 50 update the tracks of each aircraft of the group of merged tracks. At a later time, the tracks of the merged group may fail to meet the requirements to be merged. In other words, the processing of the tracks of target aircraft which were merged by merge process (Block 86) in the past, may fail the split track merging criteria or requirements at a later date. The RA display portion of combined display 150 will remain unchanged whether the merged tracks unmerge or continue to be merged since CAS process 50 still generates a composite resolution advisory to be displayed. However, when the tracks of the target aircraft unmerge or no longer meet the split track merging requirements, they are re-displayed immediately on the TA display portion of the combined display 150 as such tracks are still being updated by surveillance process 48 and CAS process 50. Aural annunciations for the new target aircraft which were considered a portion of the prior merged target aircraft will occur when the split tracks previously merged are unmerged only if the target aircraft's threat level changes to a higher or a lower state.

An example of the results of merge process (Block 86) of display preprocessing 52 ar shown in FIG. 7A and FIG. 7B. FIG. 7A, prior to implementation of merge process (Block 86), represents a combined RA and TA display 150 having a resolution advisory ring 180 which is only active when a resolution advisory is in effect, the surveillance aircraft symbol 185, the range ring 182, symbols representative of a resolution advisory 164, 162, traffic advisory symbol 154, proximate traffic advisory symbol 152, and other traffic symbols 156, 158, 160. After implementation of merge process 86, FIG. 7B, the clutter of the RA and TA display 150 is substantially reduced. The symbols 162 and 164 are merged into a single symbol 170, proximate traffic symbol 152 and traffic advisory symbol 154 are merged into a single traffic advisory symbol 172, and the three other traffic symbols 156, 158, 160 are merged into one other traffic symbol 174. As can be seen from a comparison of FIG. 7A and FIG. 7B, the resolution advisory ring 180 is unchanged as a resolution advisory is still in affect and the RA display portion of the combined RA and TA display 150 is unchanged.

The merge process (Block 86) shall specifically be described with reference to FIGS. 5, 6A and 6B. Two or more tracks representing target aircraft shall be considered split tracks from a single target aircraft and will be merged when target aircraft type requirements, range requirements, altitude requirements and altitude rate requirements are satisfied as described below. If such requirements are not satisfied, then the two or more tracks are not merged and are represented on display device 28 as separate symbols representing more than one target aircraft. The merge process 86 is shown in the flow diagram of FIGS. 6A and 6B. The merge requirements or conditions shall be explained further below with reference to the flow diagram.

Figure 6A:
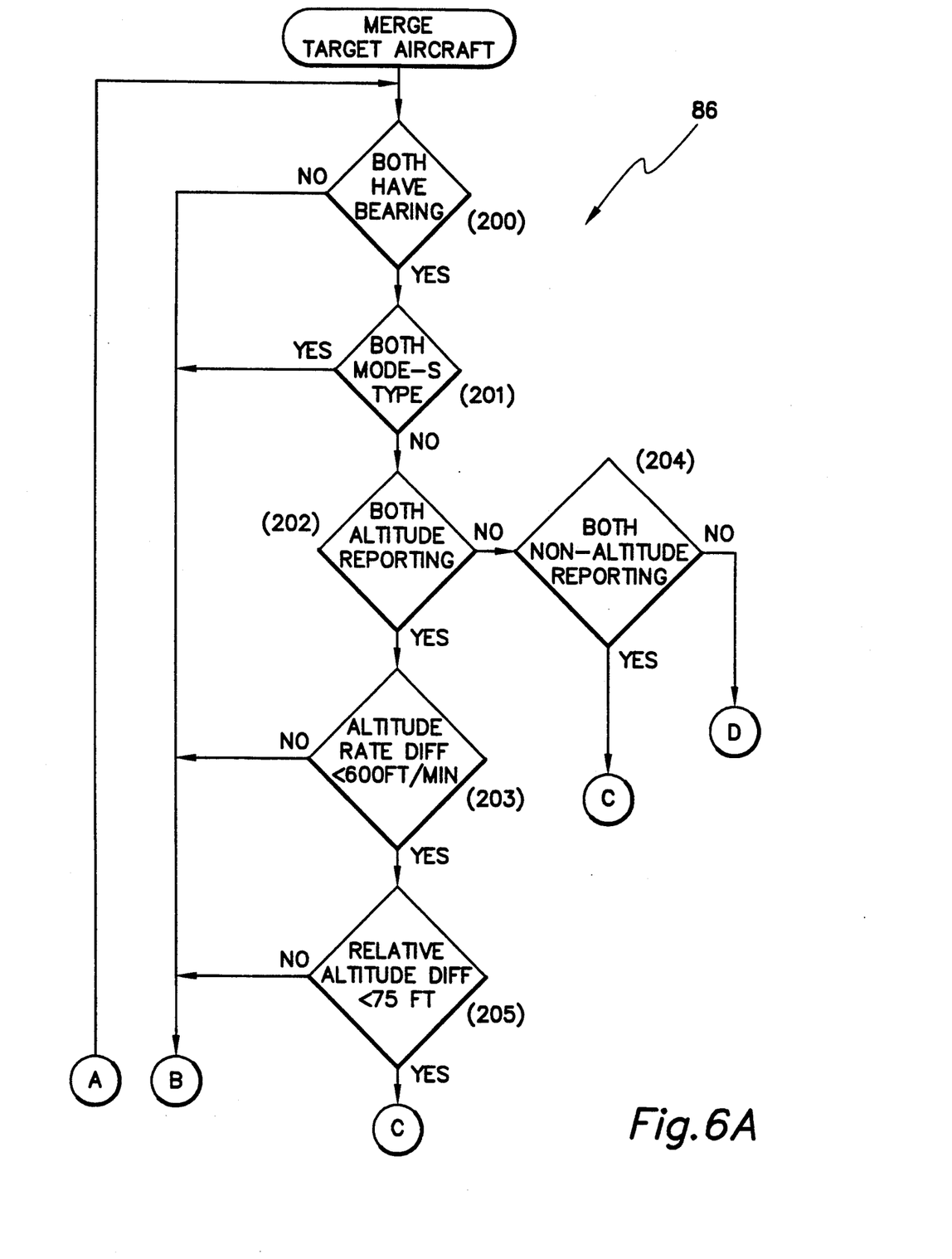
FIGS. 6A, 6B and 6C are flow diagrams of the merge process of the primary TCAS processes of FIG. 4.
Figure 6B:
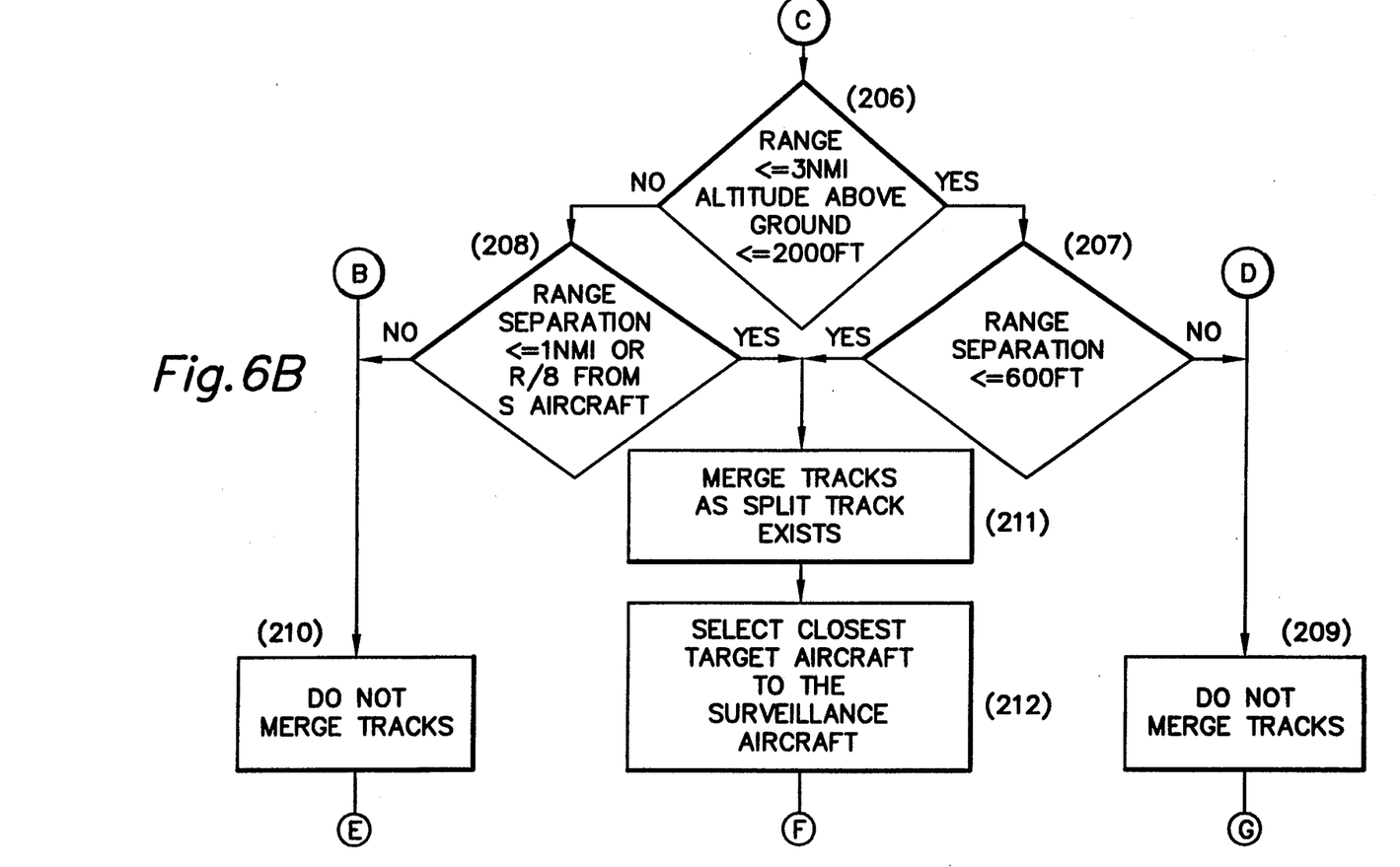

As indicated by the Blocks of the flow diagram, FIGS. 6A and 6B, two tracks representative of target aircraft are compared to each other and it is determined whether the tracks being compared are a split track and should be merged (Block 211) or whether the two tracks do not represent a split track, and should not be merged (Block 209, 210). If a merge does occur, then the track representative of a target aircraft closest to the surveillance aircraft position is selected (Block 212) and this track representative of the closest target aircraft is then compared with any other tracks which have not been tested by the merge process (Block 215). This process is continued until all of the tracks of target aircraft have been tested and the process is done. (Block 216). As such, multiple tracks can be merged into a single track for display of a single symbol for a target aircraft on display devices 28.

Target Aircraft Type Requirements

Both tracks being compared must have bearing information (Block 200). If they do not both have bearing information, then the tracks are not merged (Block 210). If they both have bearing information, then it is determined whether both tracks are representative of Mode S transponder equipped target aircraft. Since ATCRBS transponder equipped target aircraft do not have unique identifiers, multiple tracks for a single ATCRBS equipped target aircraft often occur. On the other hand, Mode S transponder equipped target aircraft have unique identifiers associated therewith, therefore, multiple Mode S tracks on a single target aircraft do not occur. Although, a Mode S transponder of a target aircraft is not supposed to reply to a ATCRBS interrogation, the Mode S transponder might reply under some conditions, for example, if a suppression pulse of the interrogation from the surveillance aircraft is not detected by the Mode S transponder equipped target aircraft. For this reason, a duplicate Mode S formulated track and ATCRBS formulated track on a single intruder may exist and must by considered by the merge process 86. In other words, a Mode S formulated track and another Mode S formulated track are not merged. On the other hand, a Mode S formulated track and an ATCRBS track are given further consideration by the merge process 86. As such, if both tracks are not from Mode S equipped target aircraft (Block 201), then the altitude requirements are considered. Otherwise, the tracks aren't merged (Block 210).

Altitude Requirements

The altitude requirements can be split into two steps. The first step is applicable to tracks which represent target aircraft which are both altitude reporting (Block 202) and the second with respect to tracks which represent target aircraft which are non-altitude reporting (Block 204). If one track is altitude reporting and the other track is non-altitude reporting, then the two tracks are not merged (Block 209).

When both tracks are of target aircraft having altitude reporting, then the altitude of the tracks and the altitude rate of the tracks are considered (Block 203, 205). When both the tracks are altitude reporting, it is determined whether the altitude rate difference between the tracks is less than 600 feet per minute (Block 203). If the altitude rate difference requirement is satisfied for altitude reporting tracks, then the relative altitude difference between the tracks is considered (Block 205). If the relative altitude difference between the tracks is less than 75 feet, then the merge process 86 further considers these tracks with regard to range requirements (Block 206). However, if the altitude rate difference between the tracks is greater than or equal to 600 feet per minute or if the relative altitude difference between the tracks is greater than or equal to 75 feet (Block 203, 205), then the two tracks are not merged (Block 210).

If both tracks are not altitude reporting, nor are they both non-altitude reporting, i.e. one track is altitude reporting and the other is non-altitude reporting, then the two tracks are not merged (Block 209). However, if the tracks are both non-altitude reporting (Block 204) then the merge process 86 further considers these tracks with regard to the range requirements (Block 206).

Range Requirements

Range requirements are determined by considering multi-path and parallel approaches/departures for landing and takeoff. Parallel approaches/departures occur near terminal control areas and lead to close separation between target aircraft. It is desirable for these target aircraft to be tracked separately. Therefore, when the surveillance aircraft approaches the terminal area where landing and takeoff is in the near vicinity, different range requirements are required than for when the surveillance aircraft is far from the landing and takeoff of target aircraft.

If the altitude requirements are met, the two tracks are merged depending on the following requirements. First, if the range (R) of the track representative of the greatest threat to the surveillance aircraft is less than or equal to three nautical miles and the altitude of the surveillance aircraft above ground level is less than or equal to two thousand feet (Block 206), then if the range separation between the two tracks being compared is less than or equal to six hundred feet (Block 207), a split track exists and the two tracks are merged (Block 211). Such conditions are for when the surveillance aircraft is within the vicinity of a terminal.

If the range (R) of the track representative of the greatest threat to the surveillance aircraft is greater than three nautical miles, or if the altitude of the surveillance aircraft above ground level is greater than two thousand feet (Block 206), then the tracks are considered a split track if the range separation between the tracks of the target aircraft is less than or equal to one nautical mile or R/8 whichever is less (Block 208). These conditions are for when the surveillance aircraft is not close to the vicinity of a terminal. If neither of these range conditions or requirements are met, then a split track does not exist and the tracks are not merged and will be shown separately on display device 28.

Figure 5:
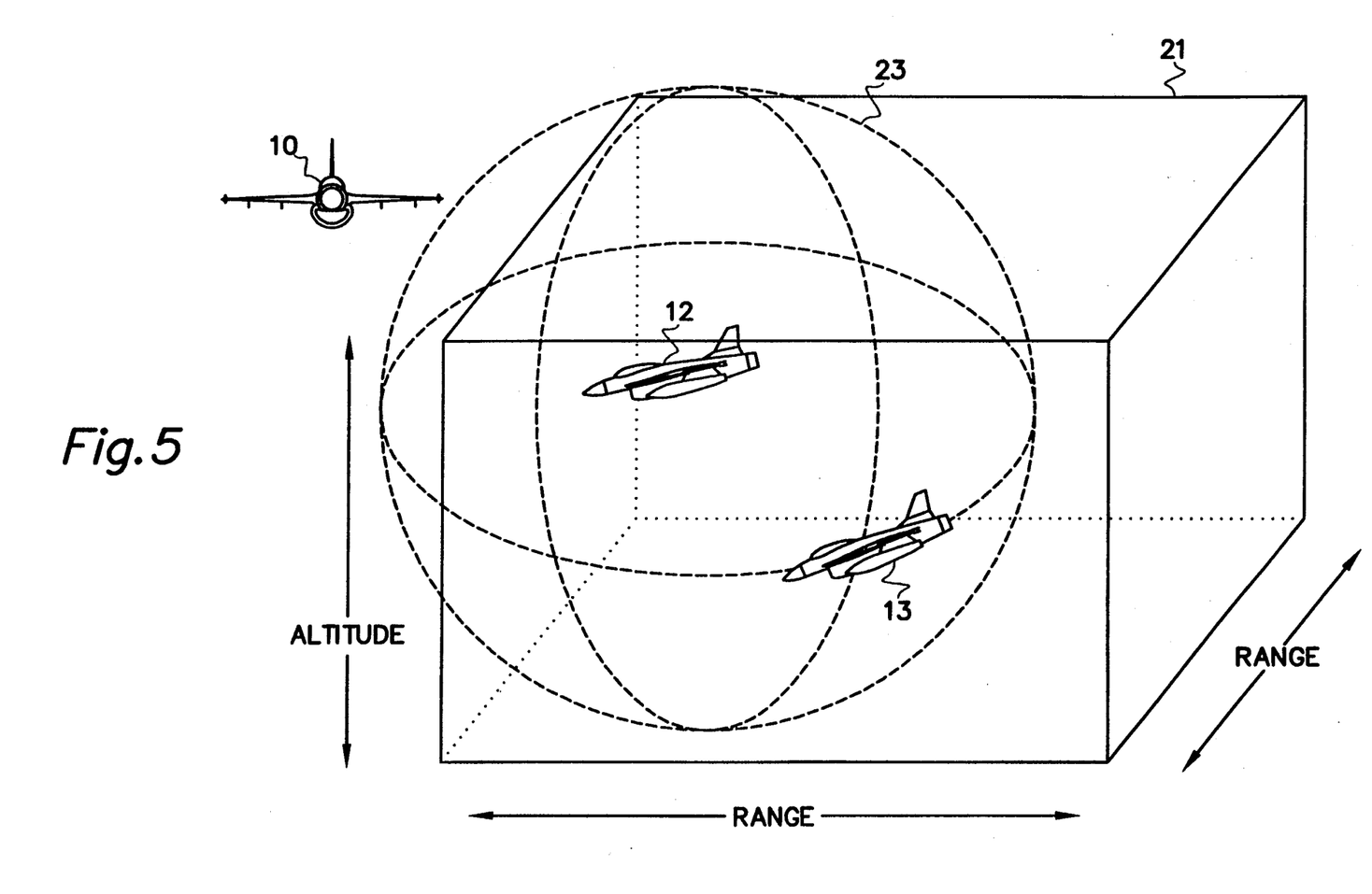
FIG. 5 is a split track merge volume in accordance with the present invention.

The range requirements can be translated into a split track merge volume as shown in FIG. 5. With the conditions as indicated above, the split track merge volume is represented by dashed lines 23 and for the range criteria is a spherical shaped volume. The altitude boundary may intersect the sphere further reducing this volume. One skilled in the art would readily recognize that a rectangular volume 21, FIG. 5, or any other geometric shape may be used as the split track merge volume. In addition, the specific range and altitude requirements, such as less than 600 feet, are subject to optimization.

As shown in FIG. 5, it can be seen that R is equal to the distance from surveillance aircraft 10 to target aircraft 12 because target aircraft 12 is the greatest threat to surveillance aircraft 10. Therefore, the spherical volume covers the volume about aircraft 12. If target aircraft 13 falls within the volume then it would be merged with tracks representative of target aircraft 12 if the other requirements are satisfied.

Figure 6C:
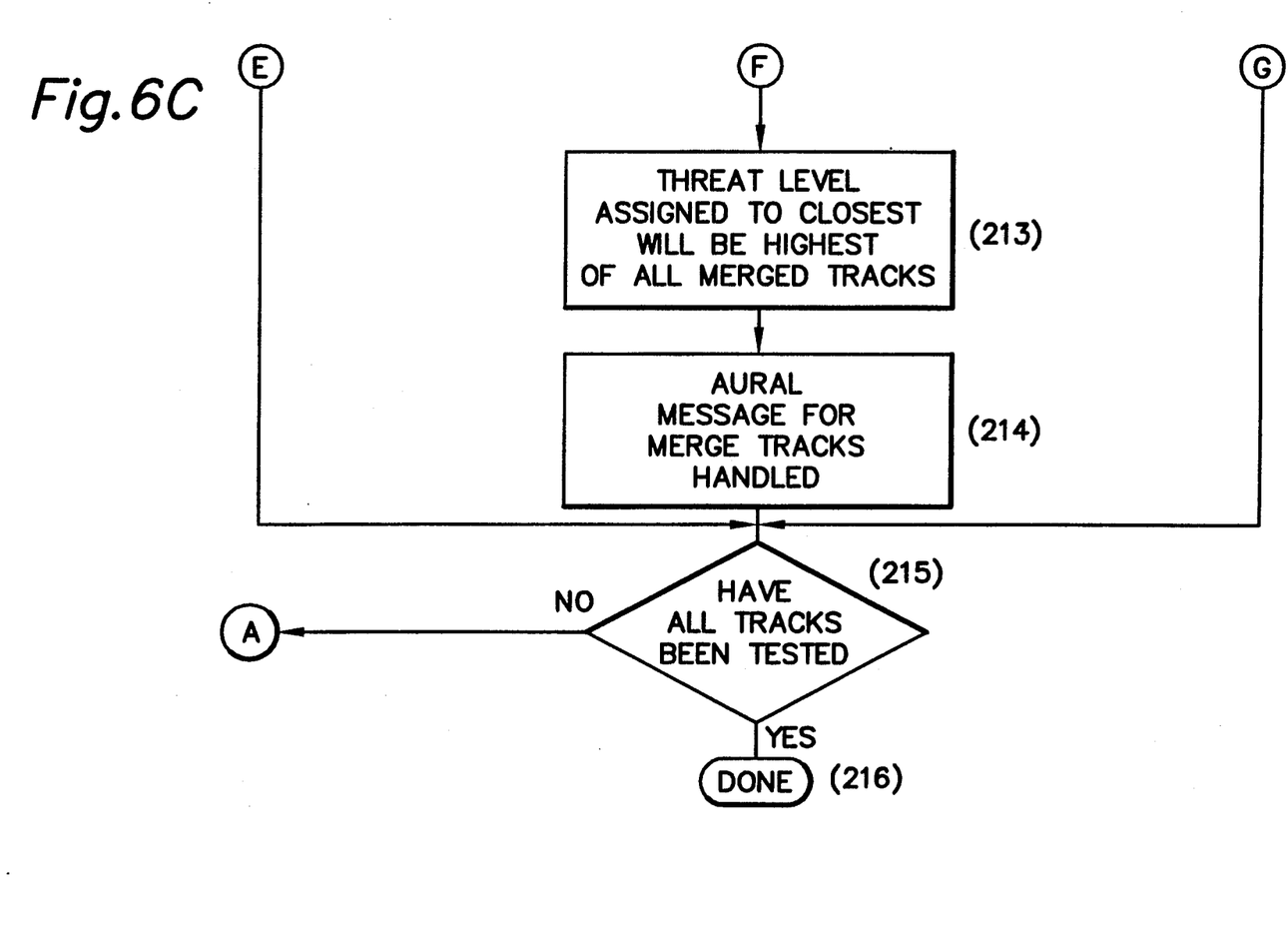

When two or more tracks meet the split track merge requirements and are merged (Block 211), the track of the closest target aircraft to the surveillance aircraft is selected for further processing with regard to other track as discussed above (Block 212). The threat level assigned to the closest target aircraft by the merge process 86 will be the highest threat of all the identified split tracks which are merged as the closest track of each pair of split tracks is selected (Block 213). In accordance with Block 214, a single aural message is established for the group of tracks which are merged and unnecessary aural messages for each track are not allowed.

Output process (Block 88) of display preprocessing 52 then outputs the top number of advisory level target aircraft to the display devices 28 after the merge process 86 is completed. The aural messages are also output to annunciation means 30. The aural annunciations will be associated only with the intruders sent to the display devices 28. This will eliminate extraneous aural annunciations corresponding to track information not sent to the external display devices 28. When the merged tracks no longer meet the split track merge criteria, aural annunciations will occur when the intruder's threat level changes to a higher or lower classification.

The merge process 86 reduces the clutter resulting from false tracks being displayed to the flight crew on a TA display, while retaining all relative threat and position information. The merged tracks representing a composite target aircraft sent to the external display devices shall have the highest threat level of any of the group of tracks which were merged. Also, the range, altitude and bearing for the composite track will be that of the target aircraft that is closest to the surveillance aircraft. As indicated previously, the split track merge reduction has no affect on the RA display or its annunciations. The RA display shows a composite of all the individual resolution advisories generated by CAS process 50.

Unlike the inclusion of severe track merging algorithms in surveillance process 48 or in CAS process 50, there is no corresponding danger in merging target aircraft tracks in the display software since both surveillance and CAS processes maintain all the tracks and the moment the merged tracks diverge representing two separate real target aircraft, they can be re-displayed as stable tracks with an adequate history. In addition, threat levels are maintained separately on each of the merged tracks and the composite symbol on the TA display portion shows the highest threat level of all the merged tracks.

One example in which merging tracks in the display software rather than in surveillance process 48 is beneficial can be seen in the case of tracks which cross each other in the range whose altitudes and bearings are similar. If the track merging were done in surveillance process 48, one of the tracks would be dropped. This target aircraft would then not be tracked until it diverted adequately from the other target aircraft. It would take a few seconds for the surveillance process 48 to re-acquire the target aircraft which is dropped and even longer for the track representative of the target aircraft to stabilize. Thus, surveillance process 48 would lose track of one of the target aircraft for a few seconds. With the track merging performed in display preprocessing 52, the display symbols are merged into one symbol and the moment the tracks diverge adequately representing both real target aircraft, the two symbols would be re-displayed. Both target aircraft would continue to be tracked by surveillance process 48 and CAS process 50 during the time when their symbols were merged. The full history of both tracks representative of the two real separate target aircraft is maintained and a resolution advisory is generated on either target aircraft throughout the entire period when the two tracks are crossing.

Those skilled in the art will recognize that only preferred embodiments of the present invention have been disclosed herein, other advantages may be found and realized, and various modifications may be suggested by those versed in the art, and it should be understood that the embodiment shown herein may be altered and modified without departing from the true spirit and scope of the invention as defined in the accompanying claims.

What is claimed is:

1. A method of processing a plurality of tracks representative of one or more target aircraft in a vicinity of a surveillance aircraft, each track generated in response to target reply signals provided by the target aircraft in response to interrogation signals transmitted by the surveillance aircraft, said method comprising the steps of:
   eliminating a portion of the plurality of tracks which are duplicate tracks of a same target aircraft;
   maintaining and updating the remaining tracks in response to the target reply signals provided by the target aircraft;
   determining a threat level for each of said remaining tracks;
   merging two or more of said remaining tracks which are possibly representative of a same target aircraft resulting in a composite track;
   and
   outputting said composite track to a display device utilizing information from a particular remaining track of the composite track having the greatest threat level to the surveillance aircraft while continuing to maintain and update all said remaining tracks.

2. A method according to claim 1, wherein said merging step comprises the steps of:
   determining whether two of the remaining tracks have a similar bearing;
   determining whether both of said two of the remaining tracks having unique addresses identifying them as separate target aircraft;
   if both remaining tracks do not have unique addresses and both have similar bearings, determining whether both of said two remaining tracks are altitude reporting or non-altitude reporting tracks;
   if both tracks are altitude reporting tracks, comparing altitude information of each of the tracks and also comparing range information of each of the tracks from the surveillance aircraft to predetermined merge conditions; and
   if both tracks are non-altitude reporting, only comparing the range information to the predetermined merge conditions; and
   merging said two tracks if said predetermined merge conditions are satisfied.

3. A method according to claim 2 wherein said merging step further includes the steps of:
   selecting one of said two of the remaining tracks having the highest threat level to the surveillance aircraft; and
   testing the selected track with regard to other remaining tracks in accordance with the process steps of claim 2 to determine if the other remaining tracks should be merged with the already merged tracks.

4. A method according to claim 2, wherein said comparing altitude step includes the steps of:
   comparing altitude rates of the tracks resulting in an altitude rate difference;
   comparing an altitude of the two tracks resulting in a relative altitude difference; and
   comparing the altitude rate difference and the relative altitude difference to the predetermined merge conditions.

5. A method according to claim 2, wherein the range comparing step comprises the step of utilizing predetermined merge conditions of more strict levels when said vicinity is near aircraft landing and/or takeoff.

6. A method according to claim 1, further comprising the step of outputting aural annunciations only for composite tracks, whereby aural annunciations are reduced as only one aural annunciation is output for a composite track which may be comprised of more than one remaining track.

7. A method according to claim 1, wherein said merging step includes the step of:
   determining that two or more remaining tracks which were merged represent two or more separate aircraft; and
   immediately outputting tracks to said display device representative of such two or more separate target aircraft.

8. A method according to claim 7, further comprising the step of transmitting aural annunciations for the tracks representing the two or more separate aircraft when such two or more separate aircraft are identified.

9. A method according to claim 1, wherein said merging step comprises the steps of:
- comparing bearing, altitude, and range information concerning the remaining tracks;
- merging two tracks falling within a track merge volume representative of predetermined range and altitude conditions.

10. An apparatus for processing a plurality of tracks representative of one or more target aircraft in a vicinity of a surveillance aircraft, each track generated in response to target reply signals provided by the target aircraft in response to interrogation signals transmitted by the surveillance aircraft, a portion of the plurality of tracks which are duplicate tracks of particular target aircraft or false tracks non-representative of target aircraft are eliminated and a remainder of the tracks not eliminated are updated in response to the target reply signals provided by the target aircraft, a threat level for each of the remainder tracks is determined, an improvement of the apparatus comprising: means for merging two or more of the remainder tracks which are possibly representative of a same target aircraft resulting in a composite track and for outputting a single symbol for the composite track utilizing the information concerning a particular remainder track of the composite track which has the greatest threat level to the surveillance aircraft while continuing to maintain and update the remainder tracks.

11. An apparatus according to claim 10, wherein said means is further defined as being for transmitting aural annunciations for the composite track, whereby if two or more remainder tracks are merged into a composite track, only one aural annunciation is transmitted.

12. An apparatus according to claim 10, wherein said means is further defined as being for determining whether the two or more of the remainder tracks merged into a composite track are actually two separate target aircraft by utilizing the maintained and updated remainder tracks.

* * * * *